Sept. 5, 1967 R. W. KRAEFT 3,339,564
MACHINE FOR CLEANING AND ASSORTING TABLE SILVER AND CONTROL
MECHANISM THEREFOR
Filed Oct. 18, 1965 12 Sheets-Sheet 3

INVENTOR
Robert W. Kraeft

BY Mawhinney & Mawhinney
ATTORNEYS

INVENTOR
Robert W. Kraeft

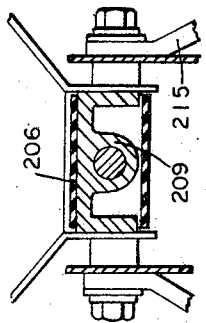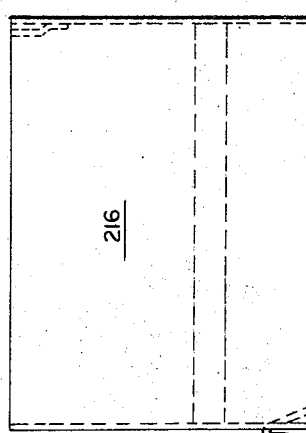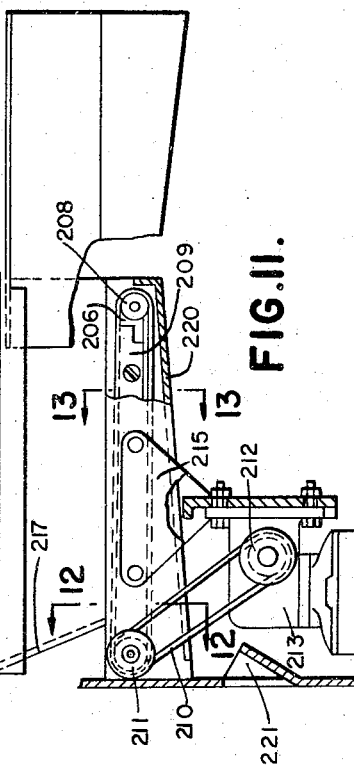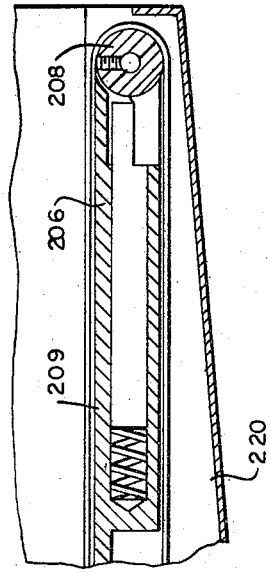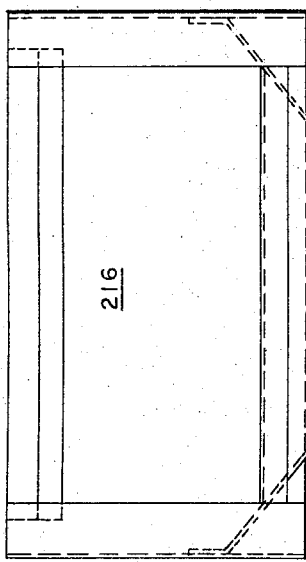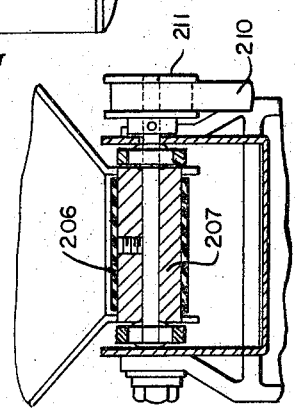

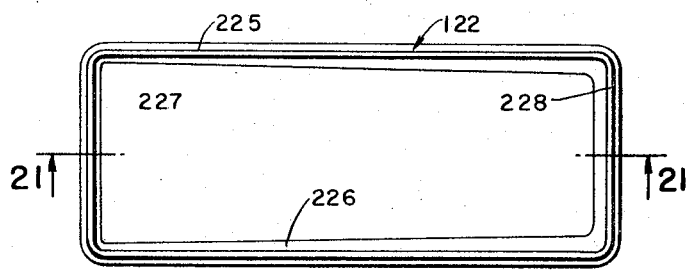
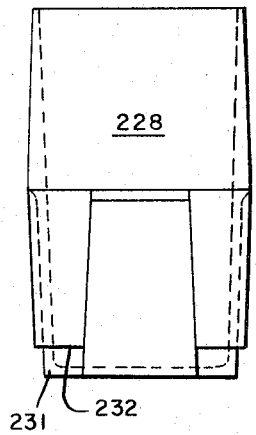
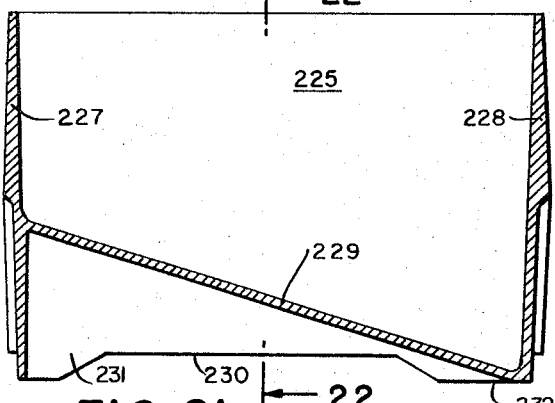
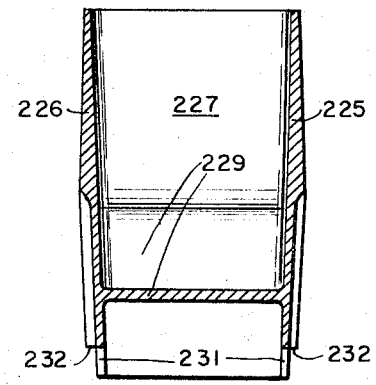
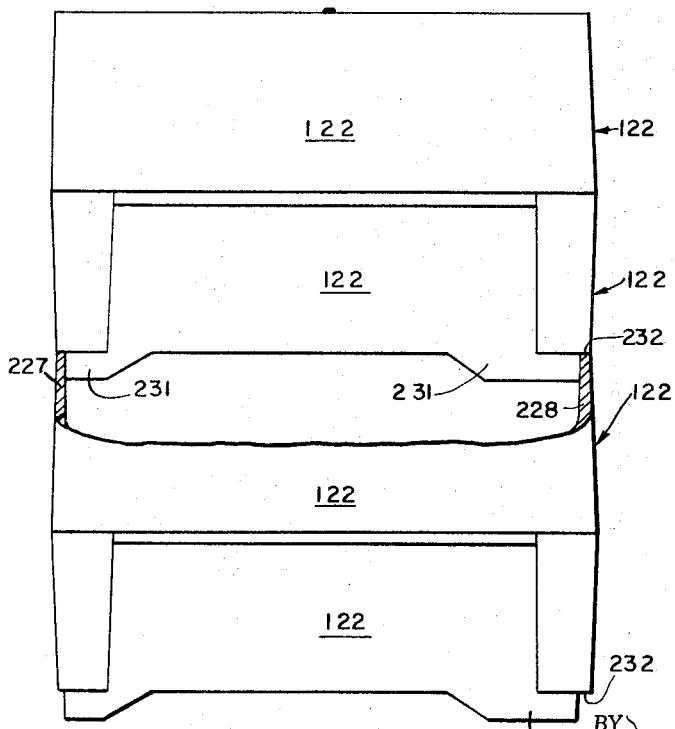

Sept. 5, 1967 R. W. KRAEFT 3,339,564
MACHINE FOR CLEANING AND ASSORTING TABLE SILVER AND CONTROL
MECHANISM THEREFOR
Filed Oct. 18, 1965 12 Sheets-Sheet 10
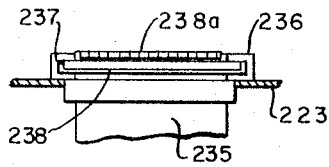
FIG. 28.
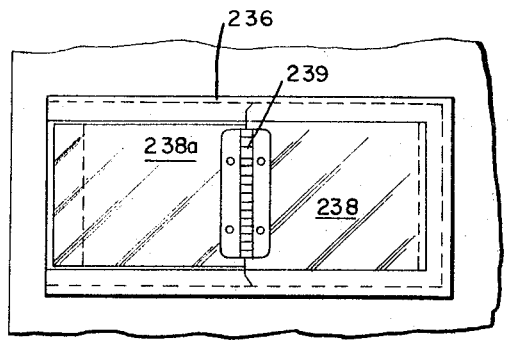
FIG. 27.
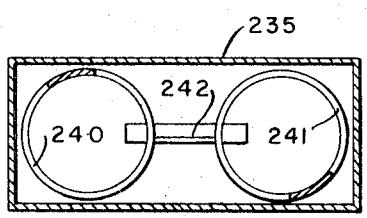
FIG. 26.
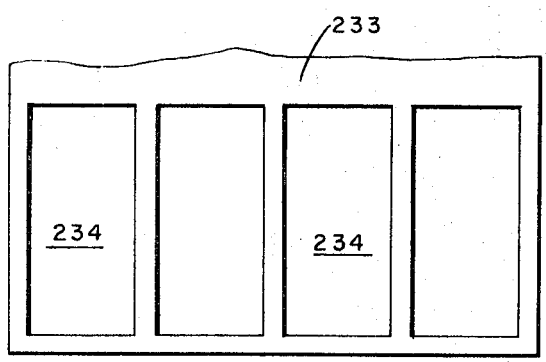
FIG. 24.
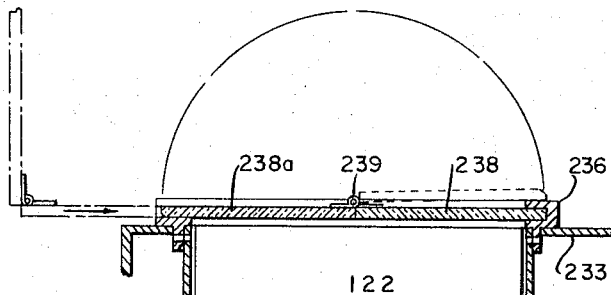
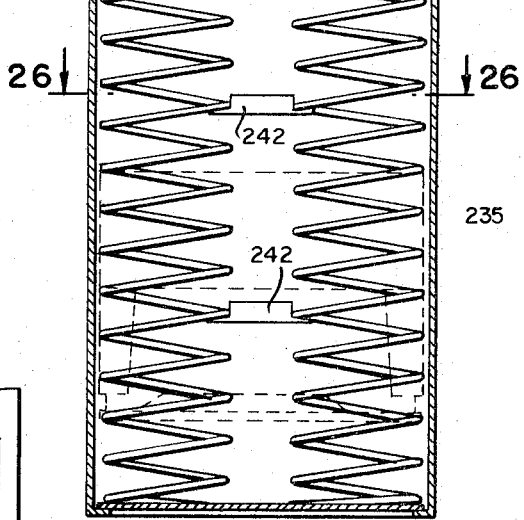
FIG. 25.
INVENTOR
Robert W. Kraeft
BY Mawhinney & Mawhinney
ATTORNEYS

TRAY CONTROL

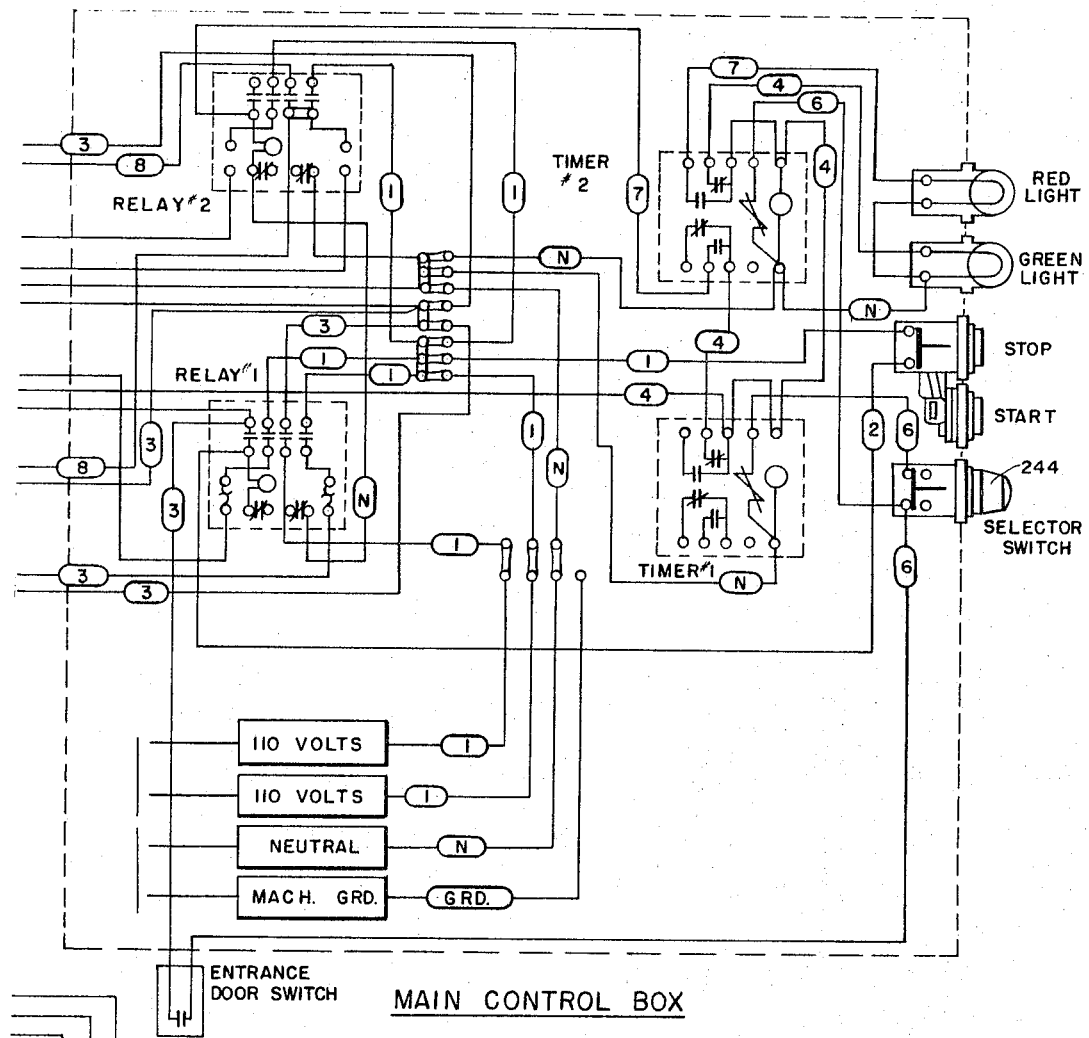
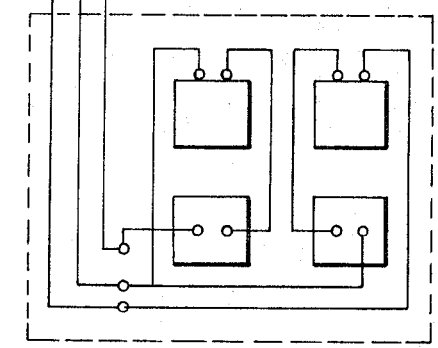
FIG.29B.

United States Patent Office 3,339,564
Patented Sept. 5, 1967

3,339,564
MACHINE FOR CLEANING AND ASSORTING TABLE SILVER AND CONTROL MECHANISM THEREFOR
Robert W. Kraeft, 60 Commercial Ave., Moonachie, N.J. 07074
Filed Oct. 18, 1965, Ser. No. 497,424
11 Claims. (Cl. 134—58)

The present invention relates to a machine for cleaning and assorting table silver and control mechanism therefor.

The invention is concerned with certain novel features over my similarly entitled prior application, Ser. No. 347,226, filed Feb. 25, 1964, now Patent No. 3,247,858, and the divisional application thereof, Ser. No. 472,750, filed June 14, 1965, which latter is concerned more particularly with the cleansing unit.

The novel features referred to may be summarized as follows:

(a) A modification of the cleansing unit as respects the side strainers;

(b) An addition to the conveying system which comprises a second conveyor positioned to receive the cleansed, rinsed and dried silverware from the first elevating conveyor with adjusting means for orienting the silver to a lengthwise orientation to facilitate its delivery to the elongated trough between the assorting rolls;

(c) A substantial rearrangement of the bin group for facilitating the handling of the assorted silverware subsequent to its removal from the machine at the point of use;

(d) Certain changes in the circuitry and electrical components by which a more nearly perfect system of cleansing and assorting silverware results, and (e) Certain cabinet constructions at the point of use adapted to receive stacks of the trays from the assorter and for offering the various items of silverware to the customers quickly and with great facility.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a perspective view of one form of machine for cleaning and assorting table silver and the like.

FIGURE 10 is an enlarged end elevational view of the hopper for receiving the silverware from the first conveyor and delivering same to the second conveyor at a re-orientation which facilitates its transfer to the assorter and the sorting of the silverware in the assorter.

FIGURE 11 is a side elevational view, with parts broken away and parts shown in section, of the hopper and second conveyor, sometimes called the small conveyor.

FIGURE 12 is a fragmentary enlarged vertical sectional view through the hopper and conveyor on the line 12—12 in FIGURE 11.

FIGURE 13 is a similar view taken on the line 13—13 in FIGURE 11.

FIGURE 14 is an enlarged fragmentary vertical sectional view taken through the small conveyor and environmental parts.

FIGURE 15 is a vertical sectional view taken on the line 15—15 of FIGURE 3 and showing the twin motors for driving the two assorter rolls.

FIGURE 19 is a top plan view of a form of tray employed.

FIGURE 20 is an end elevational view of the same.

FIGURE 21 is a vertical sectional view through the tray on the line 21—21 of FIGURE 19.

FIGURE 22 is a vertical cross-sectional view taken through the tray on the line 22—22 of FIGURE 21.

FIGURE 23 is an elevational view, with parts broken away and parts shown in section, of a number of the trays in stacked relation.

FIGURE 24 is a fragmentary top plan view of a form of cabinet employed at the point of use.

FIGURE 25 is a vertical sectional view taken through a container of such cabinet showing a tray therein and a spring arrangement for biasing the tray to an upper position.

FIGURE 26 is a horizontal sectional view taken through the container on the line 26—26 of FIGURE 25.

FIGURE 27 is a fragmentary top plan view of a cabinet showing a form of cover in place.

FIGURE 28 is a fragmentary sectional view of a portion of the top of a cabinet with a construction thereon for accommodating a slide hinged cover.

FIGURES 29A and 29B are a schematic of a system coordinating the various components for operation within one form of prescribed operational plan.

Figure 1:
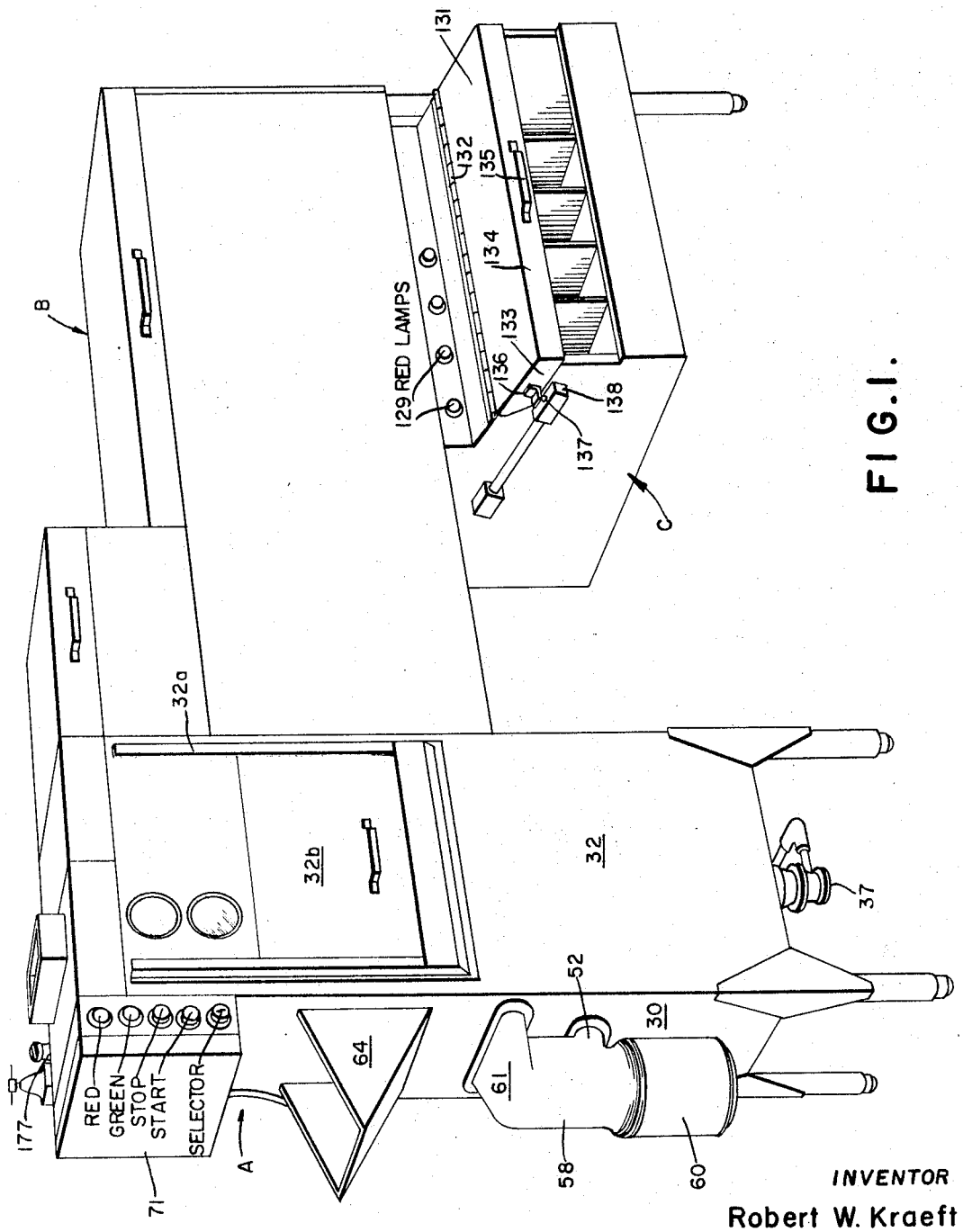
Figure 2:
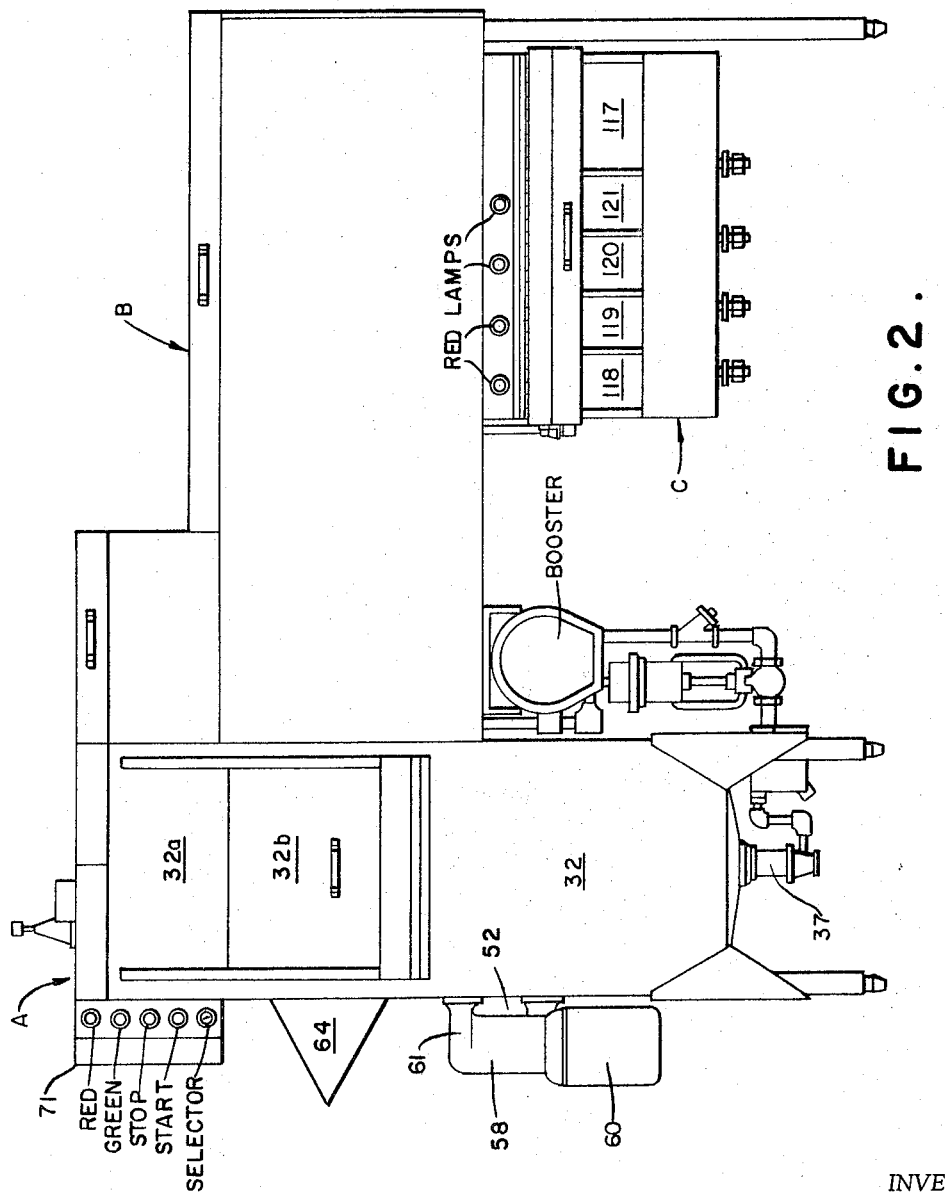
FIGURE 2 is a side elevational view of the same.

Referring more particularly to the drawings, in FIGURES 1 and 2 which illustrate an in-line form of machine, A designates the cleansing unit, B the assorter and C a bin group in which, for example, four bins are provided for receiving trays into which the cleansed and assorted silverware, after passage through the machine, is delivered.

*Cleansing unit*

The cleansing unit is illustrated in FIGURES 3, 4, 5 and 6, in which the same numerals are applied to the same parts as in my two prior applications aforesaid and no need is seen for repeating that description inasmuch as the cleansing unit per se is not specifically claimed herein but is only broadly included as an element of the claims which define the subject matter of the present invention.

Figure 3:
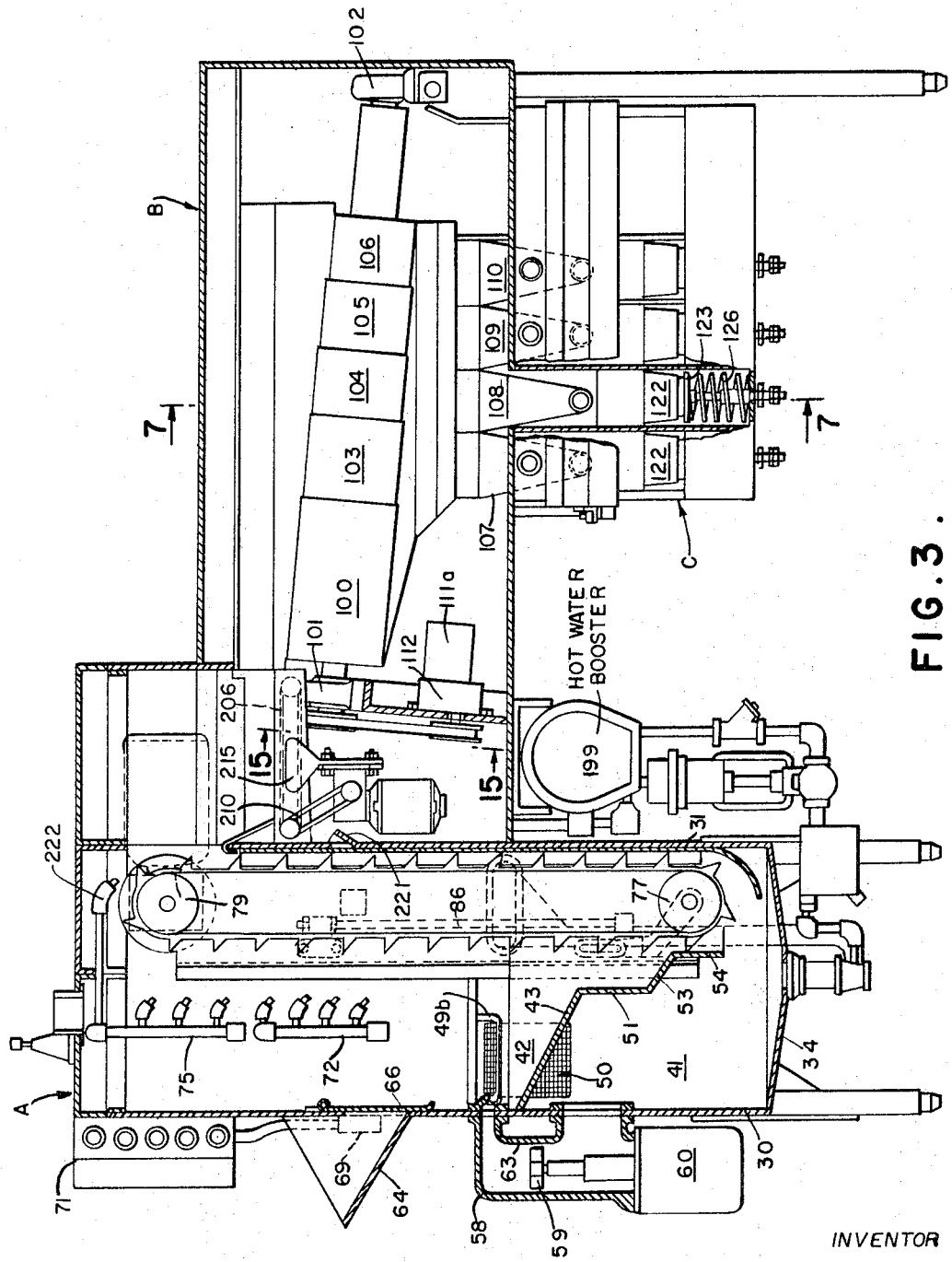
FIGURE 3 is a sectional view taken longitudinally through the machine.
Figure 4:
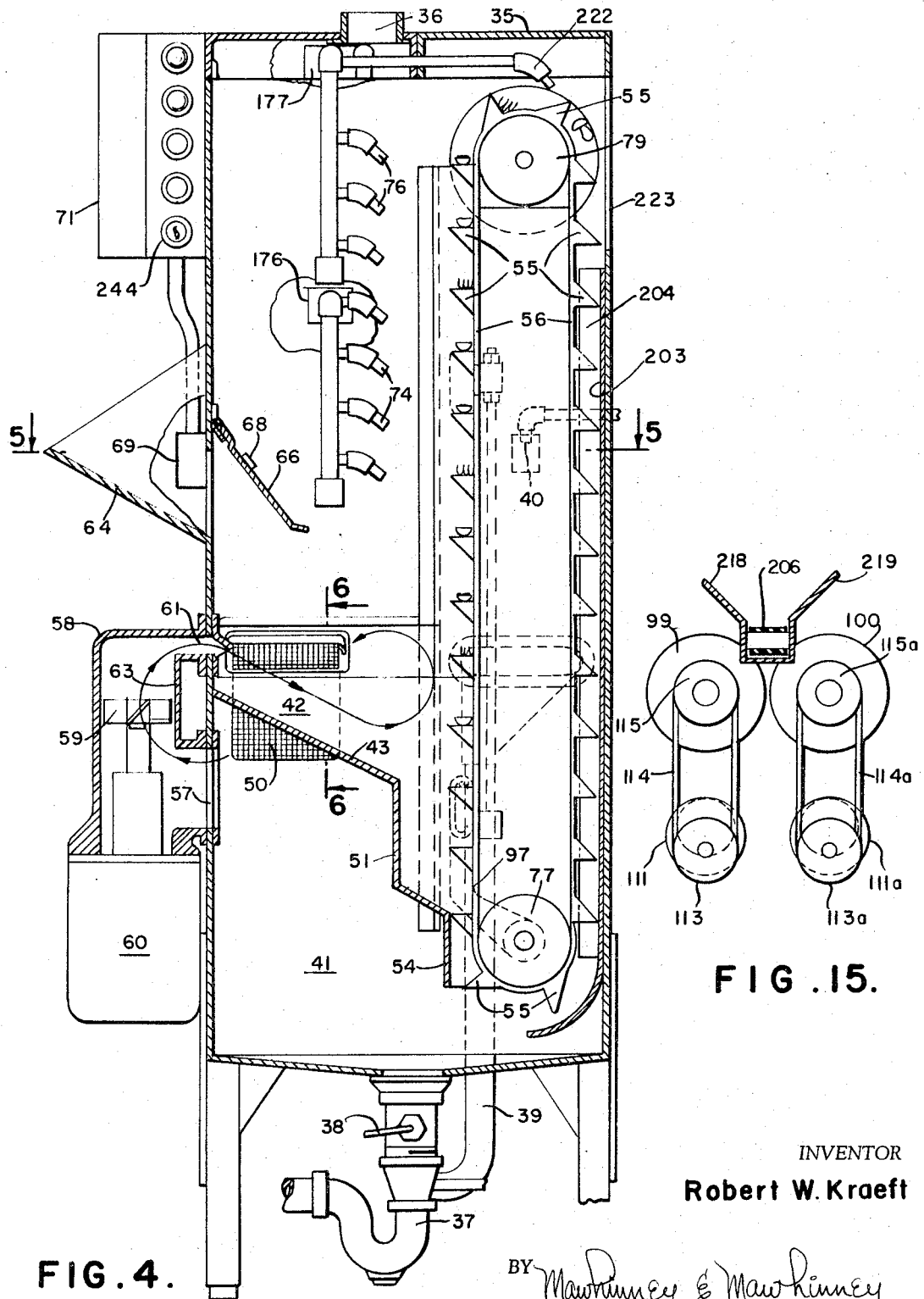
FIGURE 4 is a vertical sectional view taken on an enlarged scale through the cleansing unit.

As appears in FIGURES 3 and 4, wash water enters the casing of the machine at 40 and descends into the lower portion of the casing which constitutes a reservoir 41. This reservoir is divided from the cleansing chamber 42 by a declined partition plate 43 on to which the silverware, such as knives, forks and spoons, drops when hand fed to the exterior chute 64 after automatically opening a door 66 and incidentally tripping a switch 69 connected to the electric control box 71.

The wash water plus optional detergent is vigorously circulated by the impeller of a pump 59, rotated by an electric motor 60, from the reservoir 41 to and through ports 57 and 61 to the cleansing chamber 42 where a thorough cleansing of the articles take place after which the water is returned to the reservoir 41 through the narrow trough defined by the apron 51 and tunnel defined by the wall 54.

Cleats 55 of an upright first endless conveyor 56 rise up through the tunnel and receive the cleansed articles from the trough which adjusts the elongated articles to a lengthwise orientation in alinement with the upper cupped pockets of the cleats 55.

The ascending run of the first conveyor 56 lifts the articles above the cleansing chamber into an upper enclosed area where the cleansed articles are subjected to sprays of rinse water from nozzles 74 governed by an electrically controlled valve (such as a solenoid valve) 176 and subsequently to blasts of hot or drying air or gas from the jets 76 governed by an electrically controlled valve (such as a solenoid valve) 177.

The first conveyor 56 is driven by an electric motor 94 incorporated in the control circuitry as hereinafter explained.

Figure 6:
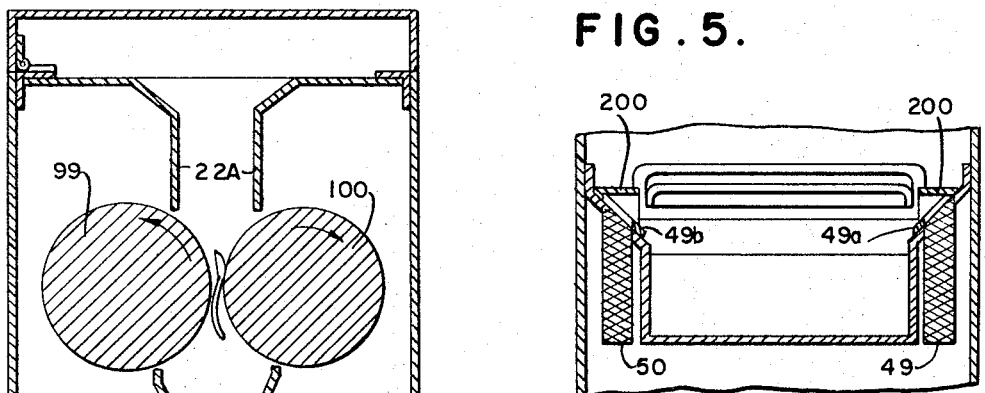
FIGURE 6 is a vertical sectional view taken on the line 6—6 also in FIGURE 4.

Strainers are mounted at the sides of the cleansing chamber 42 as best seen in FIGURES 3, 4 and 6. The strainers may be mesh bags suspended from open rectangular inclined top frames detachably fitted into opening in frame members 45$^c$ and 45$^d$.

The following are the points of novelty over the prior applications:

(a) In FIGURE 6, hoods 200 have been added carried by the open frames 49$^a$ and 49$^b$ of the strainers disposed in spaced relation substantially horizontally above the inclined top open frames 49 and 49$^a$ so as not to obstruct entrance of foreign matter such as removed food particles laterally through the frames and into the strainer bags but interposing barriers to spoons or other articles of silver and preventing same from falling into the internal spaces of these sieves or screens (strainers) which would injure the meshes and result in difficulty in extricating the articles.

(b) The electric switch 69 controlled by the entrance door 66 is on the outside of the cabinet and beside the chute 64 for greater accessibility and ease of operation.

The hinged door 66 carries at one side a magnet 68. When the door 66 is closed, to which position it is biased by gravitation, the switch 69 is within the magnetic field of the magnet 68, closing the switch and the operating circuit. When the door is opened in the act of introducing more silver, the magnet 68 moves away from the switch 69, the switch opens and cuts off the operating circuit. This is to delay the cycle of operations and to start a new cycle so that the later introduced silver will receive the full prescribed treatment.

Figure 9:
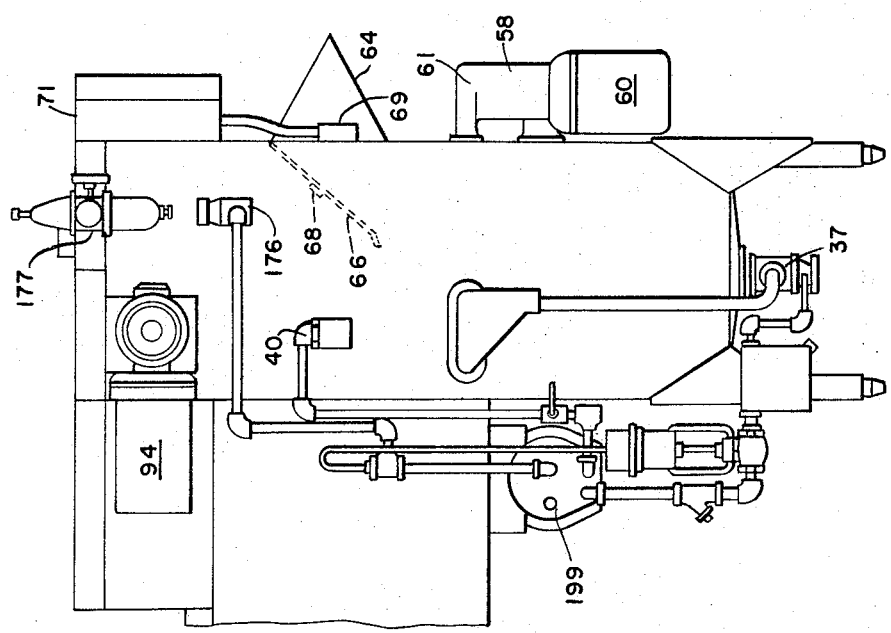
FIGURE 9 is a fragmentary side elevational view from the side opposite FIGURE 2.

(c) A hot water booster system 199 (FIGURES 2, 3 and 9) is coupled to provide hot water (preferably at approximately 180° F.) to the cleansing unit to further enhance dissolving and removal of obstinate food particles.

*First conveyor*

Figure 5:
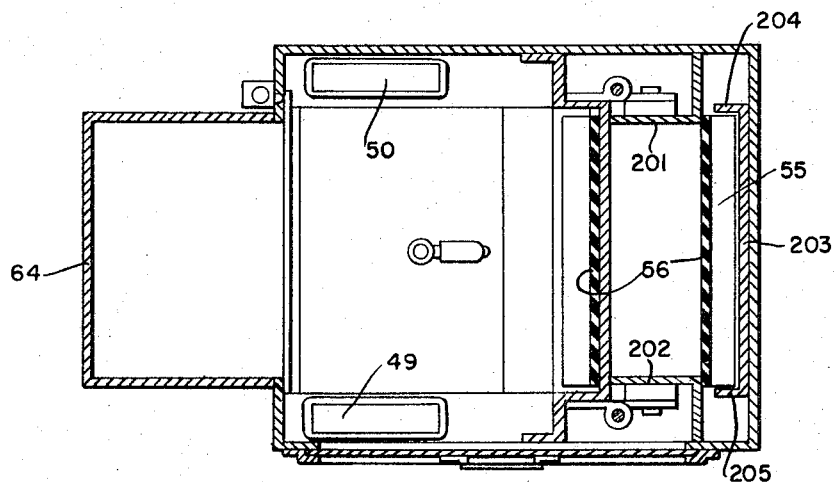
FIGURE 5 is a horizontal sectional view taken on the line 5—5 in FIGURE 4.

Referring more particularly to FIGURES 3, 4 and 5, the first conveyor, which has an elevating function comprises generally the flexible endless belt 56 trained about the lower roller 77 and the upper roller 79 and having the cleats 55 which have inclined bottom portions which are exposed upwardly when the belt travels around the upper roller 79, these inclined surfaces tending to shed the silver from the conveyor and divert the same onto a hopper leading to the second conveyor.

As shown more particularly in FIGURES 3 and 4, a blast nozzzle 222 is located above the upper end of the first conveyor in position to direct air under pressure to blow the silver from the elevator onto the second or small conveyor.

As shown more particularly in FIGURE 5, side plates 201 and 202 are provided to keep the silver out of the belt conveyor and from getting between the belt conveyor and the rollers about which it is trained. In such positions the silver will cut the belt.

As shown more particularly in FIGURE 5, a plate 203 is disposed at the descending run of the first conveyor having flanges 204 and 205, which flanges lap the sides of the cleats 55 for insuring proper tracking of the first conveyor and also for preventing foreign material from getting into the descending cleats 55. This plate 203 terminates short of the upper portion of the first conveyor 56 in order to provide an open space 223 for the discharge of the silver from the first conveyor onto the second conveyor.

A separate electric motor 94 in driving relation with the upper roller 79 is provided for driving the first conveyor. This electric motor is included in the circuitry of of the control mechanism as hereinafter described.

*Second conveyor*

This conveyor is illustrated more particularly in FIGURES 3, and 10 to 14 inclusive.

This second conveyor comprises generally an endless belt 206 running in a generally horizontal plane about rollers 207 and 208 journalled in a frame 209 suitably supported in the machine. The second or small conveyor is driven by any suitable means, for instance, by a belt 210 trained about pulleys 211 and 212. The pulley 212 is in driving relation with the roller 207, as shown in FIGURE 12, and the belt 210 receives its driving movement from a pulley 212 driven by a reduction gear from an electric motor 214 which is included in the control circuitry, as hereinafter described. The motor and reduction gear unit may be conveniently carried by a bracket 215 suspended from the frame 209.

A receiving receptacle 216 of generally hopper form open at its top to receive the silver from the first conveyor is provided with an inclined front wall 217 and inclined side walls 218 and 219 converging on the second conveyor, it being seen from FIGURE 10 that widthwise the second conveyor is narrow and that the side walls 218 and 219 incline toward the sides of the belt 206. This construction has an adjusting effect to re-orient the silver to a lengthwise position in which it is conveyed to the assorter.

As seen to best advantage in FIGURES 11 and 14, 220 indicates an inclined bottom wall of a drip pan disposed beneath the second conveyor, which as shown in FIGURE 3, directs drippings of the wash water to a catch cup or chute 221 by which such wash water is recirculated to the reservoir 41 of the cleansing unit.

*The assorter*

Referring more particularly to FIGURES 1, 2, 3, 7 and 15, 99 and 100 designate a pair of assorter rolls journalled in front bearings 101 and rear bearings 102 (FIGURE 3). As shown more particularly in FIGURES 7 and 15, these rolls are arranged side-by-side and have a trough extending longitudinally between the upper confronting portions, such trough leading to the nip between the rollers. As shown more particularly in FIGURE 15, the second small conveyor 206 is positioned to deliver the silver articles to this trough with the articles oriented in a lengthwise attitude so that the articles are in an attitude best suited for ready sorting. The rolls are driven in relatively opposite directions pursuant to arrows indicated in FIGURES 7 and 15. The axes of both rolls are inclined to the horizontal, as shown in FIGURE 3, through a sufficient angle which, together with the motion or rotation imparted to the rolls, will gravitate silver articles from the high forward receiving end adjacent the small second conveyor down to discharge sections of the rolls.

As best seen in FIGURE 3, the roll 100 is stepped down in diameter through the required number of sections 103, 104, 105 and 106. The four graduations of this roll 100 are merely exemplary. The other companion roll 99 will preferably be of uniform diameter throughout.

Figure 7:
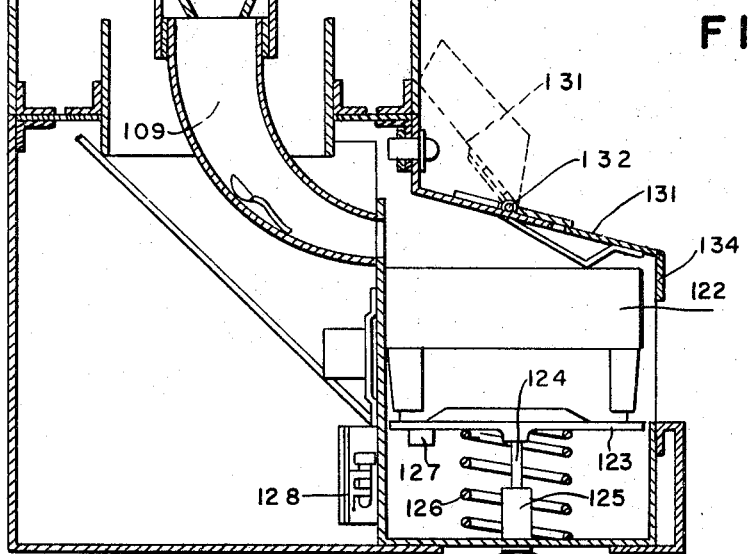
FIGURE 7 is a vertical cross-sectional view taken on the line 7—7 in FIGURE 3.
Figure 8:
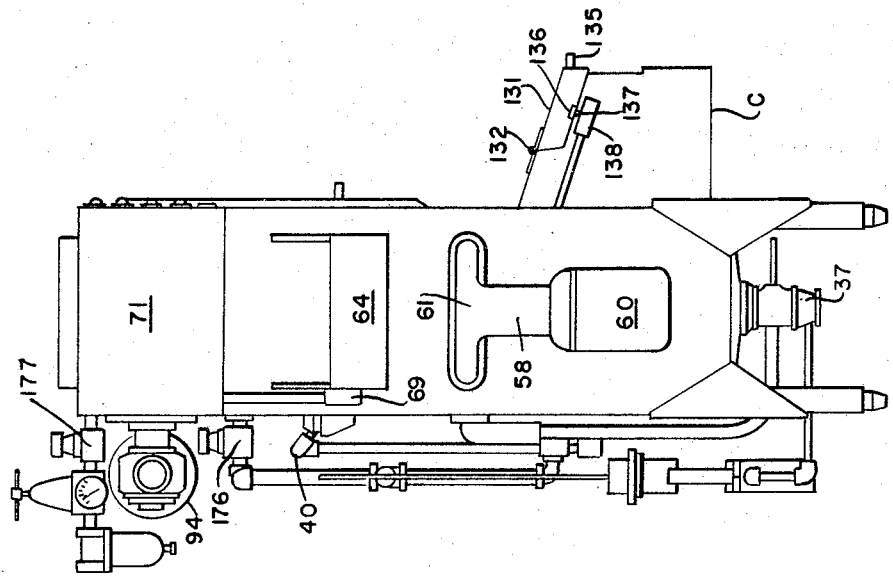
FIGURE 8 is a front elevational view of the machine.

The various sections of the roll 100 open successively wider gaps to the silver articles as such articles are moved down the trough or nip between the rolls. These gaps, as shown in FIGURE 3 and FIGURE 7, communicate with separate chutes 107, 108, 109 and 110 which charge downwardly to individual compartment in the bin group C.

The rolls may be driven in any desired manner but preferably each roll 99 and 100 will have its own individual drive, as best seen in FIGURE 15, in which two separate and distinct electric motors 111 and 111a through reduction gears 112 drive pulleys 113 and 113a and through belts 114 and 114a drive other pulleys 115 and 115a fast on the rolls 99 and 100. The rolls may be of any suitable material preferably coated with rubber or other desired substance.

The first gap 103 will be of sufficient width for the passage of knives which are more or less straight articles, while forks and spoons have offset tines or bowls and therefore require successively larger gaps for their passage. For instance, FIGURE 7 shows gap 105 suitable for the passage of teaspoons while the largest gap 106 will be of a size to pass tablespoons.

Side guards 224 depend from upper framework structure at opposite sides of the trough between the rolls 99 and 100 to prevent silver from spilling over the sides of the rolls which are rotating in opposite directions relatively upward. These guards extend down close to the peripheral surfaces of the rolls.

*Bin group*

Referring more particularly to FIGURES 1, 2, 3 and 7, the bin group C is shown as comprising five compartments, being a number which correspond with the various assorting sections of the assorter roll 100 plus an additional bin or compartment for rejects.

In FIGURE 2 these bin groups are numbered 118, 119, 120, 121 and the reject compartment 117.

As more particularly shown in FIGURE 7, each compartment is adapted to receive a tray 122 for the silverware delivered thereto by the assorting device. The trays are supported upon base members 123 adapted to move up and down vertically in the compartments, being guided in such movement by guide pins 124 projecting down substantially centrally from the base member 123 and slidably entering guide sockets 125. These base members 123 carrying the trays 122 are yieldably moved to an upper position by coil springs 126. When an empty tray 122 is initially placed in a compartment upon the base member 123 the spring 126 will maintain the tray in an uppermost position adapted to receive the silver from its particular chute, for instance, the chute 109 in FIGURE 7, As the tray 122 acquires the additional weight of the silver articles received therein, it will gradually compress the spring 126 and descend until a magnet 127 projecting downwardly from each base member 123 comes opposite a normally open electric switch 128 provided for each compartment. These switches may be magnetic mercury switches, as indicated on the schematic, one switch being supplied for each compartment. The switches 128 are normally open but when a magnet 127 of the tray 122 of any compartment moves down into a position of influence relatively to its mercury magnetic switch 128, the normally open switch is closed, closing a relay which will operate to open the main operating circuit of the machine and at the same time close a signal circuit containing either visual or audible signals, or both. For instance a red lamp 129 may be illuminated in front of the affected compartment and a buzzer may also be sounded to call the attention of the attendant to the stoppage of the machine. The attendant will then lift the cover 131, remove the full tray, permitting its base to rise and supply a fresh empty tray to the compartment; whereupon the magnetic mercury switch circuit will again be opened and the machine restored to operation under the control of the main switch.

As shown more particularly in FIGURES 1 and 7, a cover 131 is provided for the bin having sufficient extension to close over all of the compartments. This cover is hinged, as indicated at 132, to an adjacent part of the machine and has side flanges 133 and a front flange 134 to which may be attached a handle 135 for convenience in lifting the cover 131 about its hinge 132. The front flange 134 will ordinarily be deep enough to prevent removal of the trays 122 from the compartments without raising the lid, for instance, to the dotted line position of FIGURE 7. One side flange 133 carries a projection 136 in the path of a button 137 of an elecrtic switch 138 included in the operating circuitry. This switch 138 is biased to an open position requiring that the lid or cover 131 be in the down position of FIGURE 1 so as to depress the button 137 and close the operating circuitry before operation of the machine can take place.

*Trays 122*

Reference is had to FIGURES 18 to 22 inclusive in which a satisfactory form of tray is illustrated of a generally rectangular conformation having side walls 225 and 226 and end walls 227 and 228 with a sloping bottom wall 229 which forms a deep section for receiving the offset portion of forks or the bowls of spoons and the like.

Cutaway lower edges of side walls 230 leave end feet 231 upon which the trays may be supported on the base members 123 of the bins. Outwardly offset shoulders 232 are spaced above the feet 231 to receive the upper parts of the side and end walls when a number of the trays 122 are nested one above another, as shown in FIGURE 22. This nesting arrangement is useful at the point of use, as shown in FIGURES 23 to 27 inclusive.

*Point of use*

Reference is had to FIGURES 23 to 27 inclusive.

In FIGURE 23 a cabinet 233 is shown having a number of wells 234 into which may be removably or otherwise mounted containers 235 of a size to receive the nested trays 122 full of silverware. Four such wells and containers may be provided to hold respectively the assorted knives, forks, teaspoons and soup spoons or other varieties of table silverware. These containers 235 are preferably equipped with marginal upper open frames which project laterally of the container walls so as to form abutments for seating upon the counter or top wall of the cabinet adjacent the wells, as shown in FIGURE 24. These frames 236 are provided with slideways 237, open at one end, which slidably receive covers 238 which are preferably of transparent material so that the customers in a cafeteria where the cabinet is installed may inspect the contents of the top tray 122 for the wanted type of silverware. These covers 238 of glass or like material are preferably hinged, as indicated at 239, intermediate their ends to permit the outer section 238a to be rotated substantially 180° to the dotted line position of FIGURE 24, thus affording access for the hand of the customer to withdraw the selected implement from the top tray 122. For this purpose the outer cover section 238a will be narrower than the slideway 237 which are shown in FIGURE 27 to be substantially U-shaped in section. Thus the outer section 238a is at all times free of the slideways while the rear section 238 of the cover will snugly and slidably fit the slideways so as to hold the outer section 238a in proper centralized position so that on lifting it may freely clear the top flanges of the slideways.

In order to remove empty trays 122 from the cabinet container 235, the covers 238 may be completely removed from the slideways 237 and after installing a new group of full trays, the cover may be easily slid back into position in the slideways.

As shown in FIGURES 24 and 25, a suitable spring arrangement may be installed in the containers 235 for maintaining the top tray in a position in the upper portion of the container 235 for easy accessibility to the hand of the customer. Preferably an arrangement of twin coil springs 240, 241, the convolutions of which are joined by connecting pieces 242 at appropriate intervals.

Figure 16:
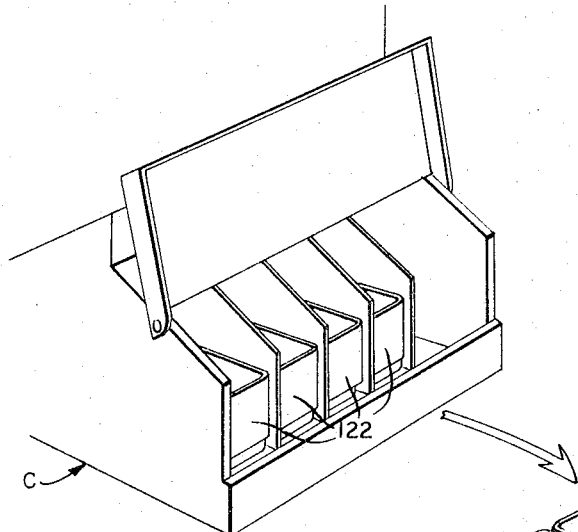
FIGURE 16 is a perspective view of the bin group with the cover raised.
Figure 17:
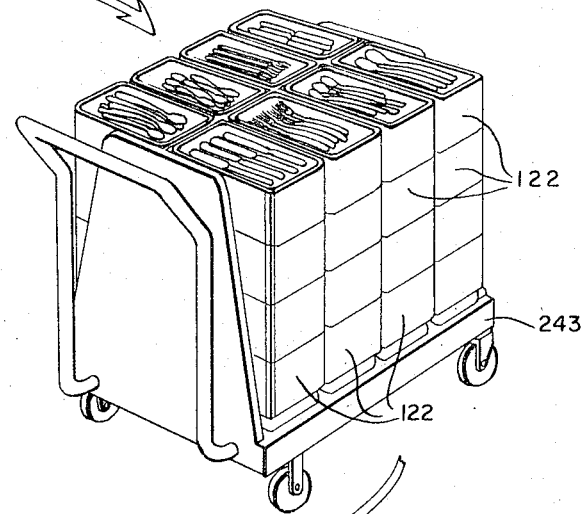
FIGURE 17 is a perspective view showing the method of transporting the trays of assorted silver from the bin group to the point of use, for instance, in a cabinet in a cafeteria.
Figure 18:
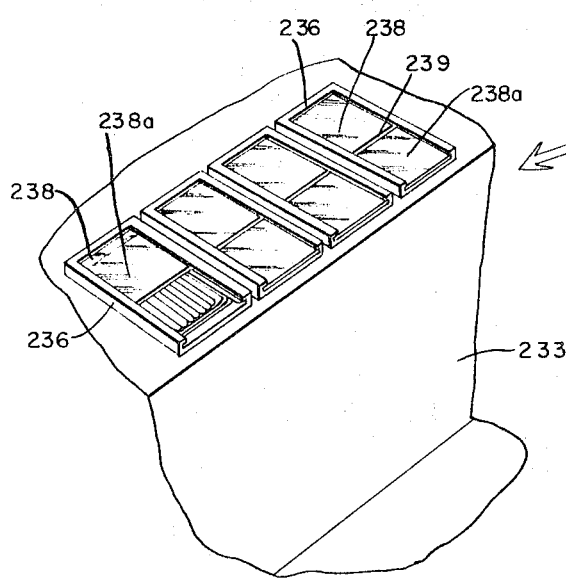
FIGURE 18 is a fragmentary perspective view of such cabinet.

Referring more particularly to FIGURES 16, 17 and 18, in FIGURE 16 the bin group C is shown with the cover in the raised position and the trays 122 in place with the machine in stopped condition.

In FIGURE 17, 243 shows a truck or other vehicle designed to accommodate stacks of the trays 122 for transportation of the trays to the point of use in the cabinet 233, as shown in FIGURE 18. The empty trays 122 are removed from the cabinet 233 and placed on the truck 243 after the full trays are installed in the cabinet 233. The truck is then returned to the machine and the empty trays placed in the bin group C.

*Control system circuitry*

Figure 29A:
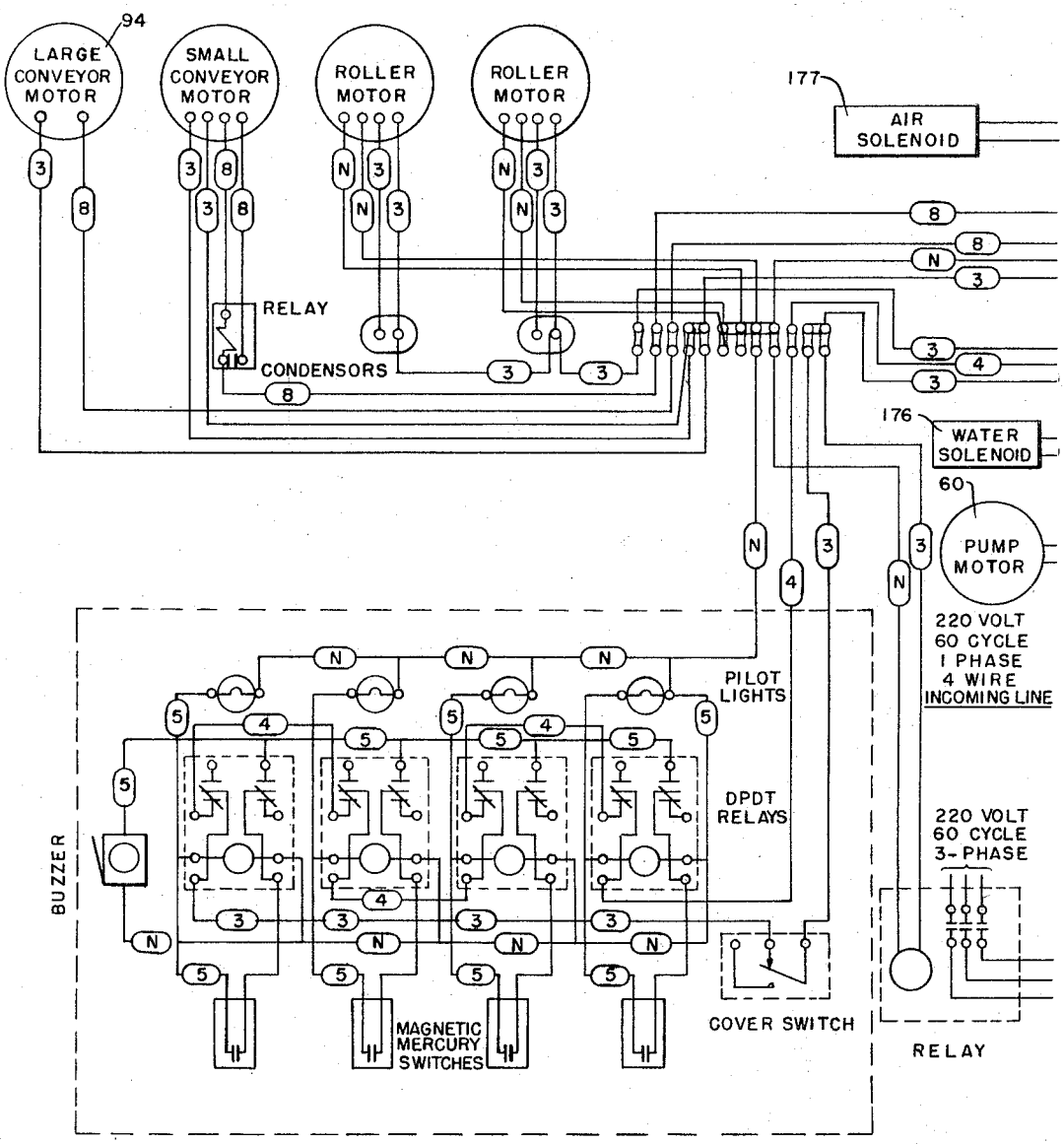

In this connection reference is made to schematic or diagram FIGURES 29A and 29B.

It will be noted at the outset that this circuit diagram includes two timers. Timer 1 is employed for delaying the operation of the first conveyor pending adequate cleaning of the silver which has been introduced into the cleaning chamber. The operation of the elevator ab initio would discharge the silver from the cleansing chamber too quickly and before all food particles are removed therefrom. This feature is of particular importance when the silver has been lying around after use for some time which permits the hardening of the food particles on the silver. This delayed action of the conveyor elevator is therefore desirable to permit the hot water and detergent in the cleansing chamber to have an opportunity, namely, a certain time period, in which to soften and release such food particles from the silver; in other words, until the food is fully washed off the silver.

Timer 2 is for regulating the cycle which ordinarily takes place in a period, for example, up to three minutes and then shuts down, except where subsequent batches of silver are thrown into the receiving chute 64 before the timing out of timer 2, in which event the cycle is reestablished so that subsequently added or introduced silver will receive the full time treatment in the cleansing chamber.

A switch lock or selector switch 244 in the control box 71 is opened only by a key. Such key may be turned in one of two directions. Turning in one direction cuts in the second timer for batch feeding; turning in the opposite direction cuts in both timers. The switch lock is therefore useful dependent on whether batch-wise or piece-wise programming is to be followed.

The following is a description of the action of the control system:

PHASE 1

*Start-stop switch in stop position.*—Power to all components is off.

PHASE 2

*Start-stop switch in start position.*—Closes relay #1 energizing:

(1) Pump motor 60
(2) Two roller motors (assorting device)
(3) Hot water booster 199
(4) Timer motors
(5) Green light If tray cover 131 is opened, items 4 and 5 turn off.

PHASE 3

*Entry of flatware into wash tank.*—Closes entrance door switch 69 which starts timers and turns on red light. After a short delay, controlled by timer #1, timer #2 closes relay #2 energizing:

(1) Washer conveyor motor 94
(2) Assorter (small) conveyor motor 214
(3) Air solenoid 177
(4) Hot water solenoid 176

If tray cover 131 is opened, all items above turn off.

A full tray will light up a corresponding light, sound a buzzer and turn off *all* the above items.

When time elapses on timer #2 the above items shut off and the cycle is complete.

PHASE 1

*Start-stop switch in stop position* (as shown) *power* is in lines 1, which terminate at relays #1 and #2 and start-stop switch.

*Neutral* (N) is connected to all 110-volt ground terminals of those components, which consists of all the pilot duty control equipment, plus the two (2) roller motors 111 and 111$^a$. (All other motors plus water and air solenoids are in the 220-volt circuit.)

PHASE 2

*Start-stop switch in start position* energizes coil of relay #1 by line 2. Neutral leg of the coils of relays #1 and #2 are wired in series through the thermal overload switches so that if any motor overloads, all power will be disconnected.

The contacts of relay #1 close, energizing lines 3, thus completing a circuit to the following components:

(1) Pump motor (220-volt) 60
(2) Two (2) roller motors (110-volt) 111, 111$^a$
(3) Hot water booster relay coil (110-volt)

plus terminating at the entrance door switch 69 and the tray control cover switch 138. (Schematic indicates tray cover closed and the trays empty.) With the tray cover 131 closed power continues along line 4 terminating at the magnetic mercury switches, but continuing through the normally closed contacts of the tray control relays, wired in series. When any one of the trays become full, a magnet 127 mounted on the spring loaded tray platform 123 closes the magnetic mercury switch 128 which energizes the coil of the related tray control relay and pilot light through line 5, thus breaking the series circuit of line 4 and making with the common buzzer 5.

When the series circuit of line 4 through the tray control is complete, that is tray cover closed and trays empty, power will continue back to the main control box to terminals #8 and #10 of the timers, #1 and #2. Terminal #10 are internally wired to the timer motors then to ground through terminals #5, completing the circuits.

Terminal #8 of timer #1 allows power through normally closed contact #7 of timer #1, then on to terminal #3 of timer #2, terminating at normally open contacts. Terminal #8 of timer #2 allows power through normally closed contact #7 to terminal of green light then to ground thus completing circuit.

PHASE 3

*Entrance door switch momentarily closed.*—By the entry of flatware into wash tank, power continues to terminal of the selector switch. (Schematic indicates selector switch in hand loading position.) Power therefore goes to terminals #9 of timers #1 and #2, energizing the solenoids of the timers which start the timing on both timers simultaneously. At the same time the solenoids actuate all contacts to be opposite of what is shown in the schematic.

*Note.*—When selector is turned to the automatic position, it disconnects line 6 from the solenoid of timer #1 so the contacts remain in the position shown through the entire cycle, omitting the time delay feature. Timer #1 utilizing only one contact #7 acts as a time delay, when the selector switch is in the hand loading position (as shown). Timer #1 is set for a fraction of the time of that of timer #2, so that the power going to terminal #3 of timer #2 is interrupted for a fraction of the total cycle. At the same time contact #7 of timer #2 breaks turning off green light and contact #6 of timer #2 makes, energizing the red light through line #7 and to ground.

When the time elapses on timer #1 the contacts revert back to their normal positions, thus the power now continues through contact #7 to terminal #3 of timer #2. Contact #2 of timer #2 closed for the total cycle, allows power to the coil of relay #2 through line 7 then to ground in series through thermal overload switches, completing its circuit. Relay #2 contacts close energizing the following components through lines 8:

(1) Washer conveyor motor (220-volt) 94
(2) Assorter conveyor motors (220-volt) 111 and 111ª
(3) Air solenoid (220-volt) 177
(4) 180° water solenoid (220-volt) 170.

The above-mentioned components remain on for the balance of the cycle. When the time elapses on timer #2, the circuit control reverts back to the same as that in Phase 2 completing the cycle.

Although I have disclosed herein the best form of the invention known to me at this time, I reserve the right to all such modifications and changes as may come within the scope of the following claims.

What is claimed is:

1. In a machine for cleaning table silver and the like:
   (a) cleaning means,
   (b) an electrically-controlled drive for the cleaning means,
   (c) conveying means related to the cleaning means for conveying off the cleaned silverware,
   (d) an electrically-controlled drive for the conveying means,
   (e) a first timer activated with the starting of the drive for the cleaning means, and
   (f) a second timer activated only after an appreciable time delay from the first timer for activating the conveying means drive and timing the length of operation of the conveying means and the further length of operation of the cleaning means.

2. A machine as claimed in claim 1, further comprising
   (h) an electrically-controlled hot water booster connected to deliver water at suitable elevated temperature to the cleansing means and included in circuit with the first timer.

3. A machine as claimed in claim 1, further comprising
   (h) an assorter related to receive the silver from the conveying means, and
   (i) an electrically-controlled drive for the assorter included in circuit with the second timer.

4. A machine as claimed in claim 3, in which the assorter comprises
   (j) at least two rolls having variably spaced gaps therebetween stepped longitudinally thereof, and the drive therefor comprises
   (k) separate electrically-controlled drives for the assorter rolls in circuit with and controlled by the second timer.

5. A machine as claimed in claim 3, further comprising
   (j) a second conveying means related to the first conveying means for receiving the cleaned silverware therefrom and related to the assorter to deliver the silver to said assorter, and
   (k) an electrically-controlled drive for the second conveying means also located in circuit with the second timer.

6. A machine as claimed in claim 3, in which the assorter comprises
   (j) a pair of rolls having a trough therebetween and progressively enlarging gaps between the rolls along the lengths thereof, and
   (k) a second conveying means positioned to receive the cleaned silverware from the first conveying means and related to the assorter to deliver the silverware to the trough thereof.

7. A machine as claimed in claim 6, in which
   (l) the second conveying means is in substantial alinement with the trough between the assorter rolls
   (m) and is of substantially the width of the trough, and
   (n) adjustment means between the first and second conveying means for orienting the silverware to a lengthwise attitude on the second conveying means so that the silverware is delivered in this attitude to the trough of the assorter rolls.

8. A machine as claimed in claim 3, further comprising
   (j) bin compartments positioned to receive the silverware from the assorter,
   (k) a yieldable base member biased to an upper position in each compartment,
   (l) removable trays for receiving the silverware freely mounted on the base members adapted to descend on predetermined load in opposition to the biasing means, and
   (m) circuit-making and breaking means carried respectively by said base members and by the bin compartments for acting to open the operating circuitry on descent of each loaded tray to suspend the operation of the machine until the loaded tray is removed.

9. A machine as claimed in claim 8, further comprising
   (n) a magazine at the point of use of the silverware for receiving stacks of said trays, and
   (o) means for urging the trays successively upward as depleted to an upper posotion in the magazine from which the silverware may be readily accessible.

10. A machine for cleansing and assorting table silver comprising
    (a) assorter rolls arranged substantially side-by-side with a trough therebetween for receiving the silver,
    (b) a narrow conveyor for holding the silver only lengthwise and positioned to advance the silver lengthwise into the trough between the assorter rolls,
    (c) means for receiving cleansed silver, cooperating with the narrow conveyor for adjusting the silver to a lengthwise orientation and delivering the silver to the conveyor,
    (d) a cleansing unit,
    (e) a first conveyor for removing the cleansed silver from the unit and delivering the silver to the narrow conveyor,
    (f) means positioned between the conveyors for forcibly ejecting the silver from the first conveyor onto said receiving means, and
    (g) separate drives for the assorter rolls giving independent transmission of movement to the rolls.

11. A machine for cleaning and assorting table silver comprising
    (a) an assorter,
    (b) bin compartments for separately receiving the assorted silver,
    (c) a movable base member in each compartment yieldably biased to an upper position,
    (d) control circuitry for controlling the operation of the assorter,
    (e) complemental make and break means included in the circuitry in each compartment one member of which is carried by the movable base and moves into active relation to the other member on descent of the base incident to imposition of a load of silver for suspending the operation of the machine, (f) a removable tray on each base member positioned to receive sliver from the assorter and transportable with its load to a point of use of the silver, (g) a movable cover on the machine in common for closing all compartments constructed and arranged to prevent removal of any of the trays when the cover is closed, and (h) make and break means in the circuitry one member of which is on the machine and the other member on the cover relatively positioned that the circuitry can be closed only when the cover is in place on the compartments.

References Cited

UNITED STATES PATENTS

| | | | |
|---|---|---|---|
| 2,212,560 | 8/1940 | Foley | 134—58 X |
| 3,125,105 | 3/1964 | Geiger | 134—58 |
| 3,141,467 | 7/1964 | Robson | 134—58 |
| 3,232,425 | 2/1966 | Le Van Hansen et al. | 134—104 X |
| 3,247,858 | 4/1966 | Kraeft | 134—46 |

FOREIGN PATENTS 250,402   6/1948   Switzerland.

CHARLES A. WILLMUTH, *Primary Examiner.*

R. L. BLEUTGE, *Assistant Examiner.*